Figure 1:
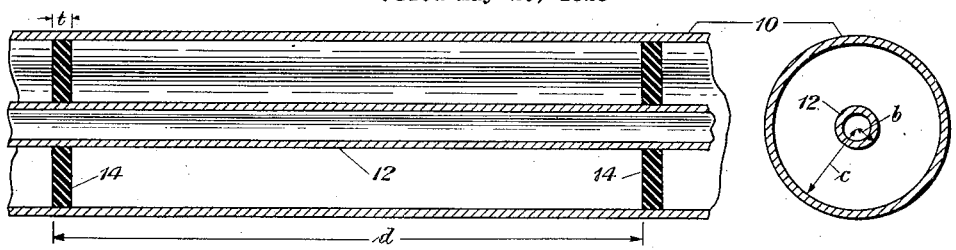

May 24, 1932.　　　　E. I. GREEN　　　　1,859,390

CONCENTRIC CONDUCTOR SYSTEM

Filed May 23, 1929

INVENTOR
*E. I. Green*
BY
ATTORNEY

Patented May 24, 1932

1,859,390

UNITED STATES PATENT OFFICE

ESTILL I. GREEN, OF EAST ORANGE, NEW JERSEY, ASSIGNOR TO AMERICAN TELEPHONE AND TELEGRAPH COMPANY, A CORPORATION OF NEW YORK

CONCENTRIC CONDUCTOR SYSTEM

Application filed May 23, 1929. Serial No. 365,520.

This invention relates to a novel form of conductor structure employing concentric cylindrical conductors for the transmission of a wide band of frequencies with relatively low attenuation.

If a solid cylindrical conductor or a hollow cylindrical conductor is provided, with a return conductor comprising a second hollow cylindrical conductor concentrically arranged with respect to the first conductor, and the two conductors are separated by a dielectric consisting largely of air or other gaseous medium, the transmission line thus formed will have a number of desirable characteristics. Its attenuation at all frequencies will be quite low as compared with the corresponding attenuation of open wire lines and cable circuits such as are now commonly used for telephone transmission. Such a transmission circuit may, therefore, be employed for the transmission of much wider bands of frequencies than is possible with types of transmission circuits heretofore used. It also has the advantage that it is substantially free from interference from neighboring conductor systems and in itself tends to produce but little interference into adjacent transmission circuits.

It is, of course, not possible to have a gaseous medium between the concentric conductors throughout their entire length. In order to maintain the conductors in their relative concentric positions it is necessary to provide some spacing means of suitable dielectric material. The spacing arrangements may, for example, assume the form of dielectric washers spaced at such intervals as are necessary for the required mechanical rigidity and strength. The presence of these spacing washers increases the attenuation, but where the spacing between washers is large, the resultant increase in attenuation may be negligible even at very high frequencies. Where, however, it is necessary to space the washers relatively close together, as for example, where the cylindrical conductors are of some flexible construction, the amount of solid dielectric per unit length of conductor may be increased to such an extent that the resultant augmentation of the attenuation cannot be disregarded.

In accordance with the present invention it is proposed to reduce the electrical effect of the closer spacing of the washers or other solid dielectric separating means by cutting out portions of the washers so as to increase the gaseous dielectric in the space occupied by the washer, and to so arrange the cut-out portions of the washers that the path for the dielectric flux between the conductors through the solid parts of the washers will be considerably lengthened, thereby decreasing the capacity and leakage effects due to the presence of the washers, with a corresponding decrease in attenuation.

The invention will now be more fully understood from the following description when read in connection with the accompanying drawings, in which Figure 1 is a sectional diagram showing the general form of the concentric conductor and the spacing of the dielectric washers, while Figs. 2 to 6, inclusive, are cross-sectional views of concentric conductor systems showing modified forms of spacing washers whereby the attenuation due to the presence of the washers is decreased.

Fig. 1 shows a typical form of concentric conductor system comprising an outer cylindrical member 10 of conductive material and an inner cylindrical member 12 also of conductive material, the two conductors being arranged concentrically and so connected electrically that one acts as a return for the other. In order that the two conductors may be maintained in proper concentric relation, spacing washers 14 are provided at suitable intervals, as shown.

A concentric conductor transmission system such as above described will have relatively low attenuation at all frequencies as compared with the attenuation of open wire lines or cable circuits such as are now commonly used for telephone transmission, provided the dielectric between the conductors is very largely of air or other gaseous medium. The presence of any considerable amount of solid dielectric material between the conductors, however, has the effect of increasing the attenuation due to the increased capacity and leakage due to the solid dielectric material. Where washers such as 14 are employed, and are spaced a considerable distance apart and are in themselves relatively thin, the amount of solid dielectric material present per unit of conductor length is so small as to produce substantially negligible increase in attenuation over that which would be present if the entire dielectric space were gaseous. If, on the other hand, it is necessary for mechanical or other reasons to closely space the washers, as for example, where the conductors 10 and 12 are flexible, the resultant increase in attenuation may be so great as to render the system impractical as compared with known types of transmission systems.

Suppose that in a concentric conductor system spacing washers are separated a distance $d$ measured from center to center (see Fig. 1). Now, let $C_d$ be the capacity between the conductors of a section of length $d$ with air dielectric only. Then the capacity $C_t$ of a section of conductor having a length equal to the width of a spacer, but with air dielectric, may be expressed $$C_t = \frac{t}{d} C_d \quad (1)$$

where $t$ is the width of the spacer.

If, however, the spacer is present, the capacity $C'_t$ between the conductive surfaces corresponding to the spacer will be $$C'_t = \frac{tK}{d} C_d \quad (2)$$

where $K$ is the dielectric constant of the spacer. From (1) and (2) it is evident that the increase in capacity due to the presence of the spacer as compared with air dielectric throughout is $$C'_t - C_t = \frac{t}{d}(K-1)C_d \quad (3)$$

Therefore, the capacity $C_d$ of a section of length $d$ is increased by the amount represented by (3), due to the use of the spacer, and the resultant capacity $C'_d$ becomes $$C'_d = \left[(K-1)\frac{t}{d} + 1\right] C_d \quad (4)$$

Now, if $C_a$ represents the capacity of a mile of concentric conductor with air dielectric, $C_s$, the capacity per mile of the conductor with dielectric spacers, becomes by analogy to (4)

$$C_s = \left[(K-1)\frac{t}{d} + 1\right] C_a \quad (5)$$

The capacity $C_a$ may be readily computed from the known formula $$C_a = \frac{.03883}{\log_{10} \frac{c}{b}} \times 10^{-6} \quad (6)$$

farads per mile where $b$ is the outer diameter of the inner conductor in inches and $c$ is the inner diameter of the outer conductor in inches. (See Equation 121, page 80, Standard Handbook for Electrical Engineers, fourth edition.)

Now suppose we have a system in which the diameter of the outer conductor is 2½ inches and its shell is .109 inch thick, while the inner conductor has a diameter of ⅝ inch with a shell .049 inch thick. Assume, also, that the spacers are ¼ inch thick and are composed of isolantite having a dielectric constant $K=6$.

The capacity $C_a$ per mile (without spacers) becomes, from Equation (6):

$$C_a = .0691 \times 10^{-6} \text{ farads per loop mile} \quad (7)$$

The capacity $C_s$ (with spacers) becomes, from (5) and (7), where the washers are spaced five feet apart, $.0705 \times 10^{-6}$ farads per loop mile. If the spacing is reduced to one foot, $C_s$ becomes $.0763 \times 10^{-6}$, and for a six inch spacing it increases to $.0865 \times 10^6$ farads per loop mile.

Now, from Equation (5), it is evident that $$1 + \frac{(K-1)t}{d}$$

is the ratio of the capacity with spacers present to the capacity with all air dielectric. This ratio for the five foot spacing is 1.021, an increase in capacity of anly two per cent. due to the spacers, while for a twelve inch spacing it is 1.104 or an increase of ten per cent., and for a six inch spacing it becomes 1.208, an increase of over twenty per cent.

From the foregoing it is evident that if for mechanical reasons the washers must be spaced closely together, the increase of capacity becomes of importance and cannot be neglected. Of course, the ultimate criterion of the spacing from an electrical standpoint is the increase in attenuation due to the spacers at the highest frequency which is to be transmitted.

The high frequency attenuation may be expressed $$\alpha = \frac{R}{2}\sqrt{C/L} + \frac{G}{2}\sqrt{L/C} \quad (8)$$

where $\alpha$ is the attenuation per mile, R the resistance per mile, C the capacity per mile, L the inductance per mile, and G the leakage per mile. R and L are not affected by the character of the insulation between the conductors, and are given by the following formulæ:

$$R = .08320\sqrt{f}(1/b + 1/c) \quad (9)$$

ohms per mile $$L = 0.7411 \log_{10} \frac{c}{b} \times 10^{-3} \quad (10)$$

henries per mile where $f$ is the frequency in kilocycles.

For the particular circuit above assumed R and L have the following values at 1,000,000 cycles:

$$R = 10.73 \text{ ohms per loop mile} \quad (11)$$

$$L = .000421 \text{ henries per loop mile} \quad (12)$$

The capacity C with air dielectric is given by Equation (7), and with isolantite washers having different spacings its values correspond to the values of $C_s$ as previously given. The leakage G also varies with the dielectric and is, moreover, a function of the frequency. It is substantially zero with air dielectric. The leakage conductance due to the spacers may be expressed as follows:

$$G = \omega P K \frac{t}{d} C_a$$

$$= \omega P K \frac{t}{d} \frac{0.03883}{\log_{10} \frac{c}{b}} \times 10^{-6} \quad (13)$$

mhos per mile where P is the power factor and $\omega$ is $2\pi$ times the frequency $f$. The expression $$K \frac{t}{d} C_a$$

is, of course, by analogy to Equation (2) the capacity of the spacers per mile.

If again, we assume that isolantite is the dielectric used for the spacers, its power factor may be taken as P = .004, and from Equation (13) G (1,000,000 cycles) becomes only $43.4 \times 10^{-6}$ mhos per mile for a five foot spacing of the washers, increasing to $217 \times 10^{-6}$ mhos if the spacing is reduced to one foot, and $434 \times 10^{-6}$ mhos is the spacing is only six inches.

Substituting in Equation (8) these values and the corresponding values of $C_s$ as previously computed, together with the values of R and L as given by Equations (11) and (12), we have an attenuation per mile of .0711 with spacers every five feet, .0804 with spacers every twelve inches, and .0909 with spacers every six inches.

From Equation (8) the attenuation for air dielectric only (using the value of C as given by Equation (6)), becomes .0687 per mile.

Now the ratio of the attenuation with spacers present to the attenuation with air insulation only becomes, for the five foot spacing, 1.035, but increases to 1.17 for the twelve inch spacing and to 1.32 for the six inch spacing. In other words, the attenuation is increased only 3½ per cent. by the use of the spacers when they are separated five feet, but the increase in attenuation is 17 per cent. if the spacing is only twelve inches and the increase is 32 per cent. for a six inch spacing. It, therefore, becomes highly desirable, where the washers are closely spaced, to reduce their electrical effect by changing their mechanical form without reducing their mechanical effectiveness.

Figure 2:
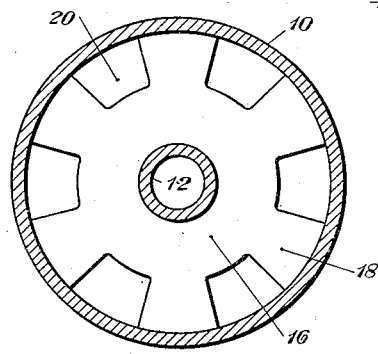

The effect of the presence of the washers from an attenuation standpoint may be decreased by cutting out portions of the washers, so that an arrangement which may be roughly similar to a hub 16 and spokes 18 is provided, as shown in Fig. 2. The air spaces 20 between the spokes reduce the effective dielectric constant of the spaces between the spokes, thereby decreasing the effective capacity between the conductors due to the spacers and also reducing the leakage.

Figure 3:
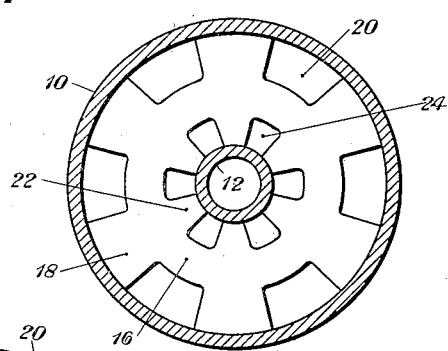

Still further improvement might be secured by forming the washers, as shown in Fig. 3, in the form of a ring 16 with external projecting spokes 18 and internal projecting spokes, 22. This results in forming air spaces such as 20 and 24, thereby still further decreasing the effective dielectric constant of the spacers without materially reducing the mechanical strength of the spacers.

Figure 4:
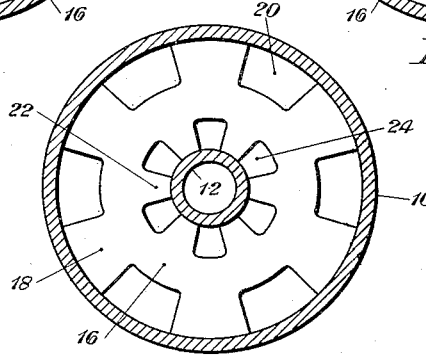

In the arrangement of Fig. 3 the air spaces such as 20 and 24 are arranged along the same radii. The attenuation may be further decreased, however, by staggering the air spaces, as shown in Fig. 4. Here the amount of solid dielectric and the amount of air space is just the same as in Fig. 3 but the path of the dielectric flux between the two conductors 10 and 12 is considerably increased, as the flux can no longer find a path along direct radial lines from conductor to conductor but must pass to one side or the other along the ring 16. This reduces the capacity due to the presence of the spacers by, in effect, changing the dimensions $b$ and $c$ of Equation (6). It also results in decreasing the leakage, as will be evident from the presence of the dimensions $b$ and $c$ in Equation (13). The result is a considerable decrease in the attenuation over what would be expected from the mere provision of the air spaces in the form shown in Fig. 3.

Figure 5:
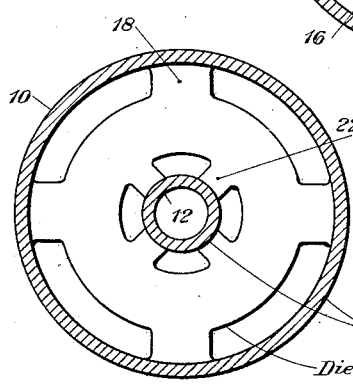

Fig. 5 shows a form of washer similar to that of Fig. 4 with the spokes 18 and 22 staggered, but employing a smaller number of spokes and thereby somewhat increasing the amount of air space in the washer.

Figure 6:
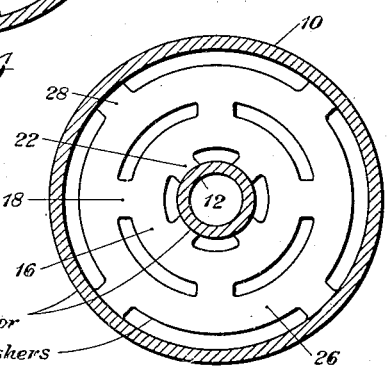

The effective length of the dielectric path from conductor to conductor may be still further increased (and the attenuation consequently diminished) by employing the arrangement shown in Fig. 6, in which two rings 16 and 26 are provided with spokes 18, 22 and 28 staggered as shown, the spokes 22 and 28 being arranged on the same radii but the spokes 18 being staggered with respect to the spokes 22 and 28. This results in a dielectric path along the spokes 28, thence laterally through the ring 26, thence through the spokes 18 to the ring 16, again laterally through the ring 16, and thence through the spokes 22.

It will be obvious that the general principles herein disclosed may be embodied in many other organizations widely different from those illustrated without departing from the spirit of the invention as defined in the following claims.

What is claimed is:

1. In a conducting system for the communication of intelligence, two concentrically arranged conductors so connected that one acts as a return for the other, insulating spacers arranged at intervals in the space between the conductors, said spacers each comprising concentric rings of dielectric material with spokes of dielectric material extending between adjacent rings, and with spokes of dielectric material extending between each conductor and the ring nearest to said conductor.

2. In a conducting system for the communication of intelligence, two concentrically arranged cylindrical conductors so connected that one acts as a return for the other, spaced insulating washers arranged at intervals in the space between the conductors, said washers each comprising rings of dielectric material having spoke-like members extending between rings and between each conductor and the ring nearest said conductor, the successive spokes in a radial direction being offset and staggered with respect to one another.

In testimony whereof, I have signed my name to this specification this 21st day of May, 1929.

ESTILL I. GREEN.